United States Patent [19]

Gulden et al.

[11] 4,134,739

[45] Jan. 16, 1979

[54] STARTING DEVICE FOR A REFORMED GAS GENERATOR

[75] Inventors: Peter Gulden, Erlangen; Friedrich Kozdon, Spardorf; Eugen Szabo de Bucs; Walter Kusebauch, both of Erlangen; Helmut Forster, Neunkirchen; Mathias Schnicke, Uttenreuth; Heinz Christoph; Berthold Pfadenhauer, both of Nuremberg; Gerald Edinger, Berlin, all of Germany

[73] Assignee: Siemens Aktiengesellschaft, Munich, Germany

[21] Appl. No.: 779,905

[22] Filed: Mar. 21, 1977

[30] Foreign Application Priority Data

Apr. 5, 1976 [DE] Fed. Rep. of Germany ....... 2614673

[51] Int. Cl.² .............................................. C10G 9/04
[52] U.S. Cl. .......................................... 48/107; 123/3; 123/122 G; 431/328
[58] Field of Search ............... 48/212, 107, 61; 123/3; 123/122 G; 252/373; 431/287, 328, 329

[56] References Cited

U.S. PATENT DOCUMENTS

| | | | |
|---|---|---|---|
| 2,552,845 | 5/1951 | Crosby | 431/328 |
| 2,915,377 | 12/1959 | Reichhelm | 48/212 |
| 3,155,142 | 11/1964 | Stack | 431/328 |
| 3,418,979 | 12/1968 | Reichmann | 431/328 |
| 3,954,423 | 5/1976 | Hamper et al. | 48/107 |

FOREIGN PATENT DOCUMENTS

| | | | |
|---|---|---|---|
| 2359542 | 6/1975 | Fed. Rep. of Germany | 48/107 |
| 2359594 | 3/1975 | Fed. Rep. of Germany | 48/107 |

*Primary Examiner*—S. Leon Bashore
*Assistant Examiner*—Peter F. Kratz
*Attorney, Agent, or Firm*—Kenyon & Kenyon, Reilly, Carr & Chapin

[57] ABSTRACT

A starting device for reformed gas generators of the type in which atomized or evaporated liquid, hydrocarbon containing fuel is catalytically reacted with a gas containing oxygen at elevated temperatures to form a fuel gas, includes a conically shaped housing having an outlet for coupling to the inlet of the reformed gas generator, a gas permeable burner plate within said housing, a fuel injection nozzle arranged so that nearly the entire surface of the burner plate is supplied with fuel, a heat-resistant, gas permeable terminating plate filling, the outlet of the starting device and defining, with the burner plate, a combustion chamber, an ignition device disposed in said combustion chamber and means for introducing the air and atomized fuel into the combustion chamber through the burner plate.

11 Claims, 3 Drawing Figures

STARTING DEVICE FOR A REFORMED GAS GENERATOR

BACKGROUND OF THE INVENTION

This invention relates to reformed gas generators in general and more particularly to an improved starting device for a reformed gas generator.

Reformed gas generators in which atomized or evaporated liquid, hydrocarbon containing fuel is catalytically reacted with a gas containing oxygen at elevated temperature to form a fuel gas, particularly for the operation of internal combustion engines are known.

Reformed gas generators can be used for instance, for catalytically converting hydrocarbon containing liquid fuels into a fuel gas that is better suited for the operation of internal combustion engines than the liquid fuel itself. For, in internal combustion engines supplied with liquid fuel, the incomplete evaporation of the fuel and the nonuniform mixing with combustion air lead to incomplete combustion and to the emission of harmful substances. Furthermore, antiknock agents must as a rule be admixed to the fuel, resulting in the content of substances injurious to health in the exhaust gas being further increased. The objectionable pollution of the air which is thus produced can largely be avoided if the internal combustion engines are operated with fuel gas i.e. reformed gas.

In a reformed gas generator the hydrocarbons are converted into a fuel gas by partial catalytic oxidation with a gas containing oxygen. The fuel gas can be mixed with further combustion air and can be burned in combustion devices, particularly in internal combustion engines. Since this fuel gas has a high octane number, an addition of antiknock agents to the liquid fuel is not required.

In order to bring such a catalytic generator into operation, the catalysts must be heated up to the required operating temperature. This can be accomplished, for instance, by igniting the fuel and the air in a combustion chamber located in front of the reaction chamber and conducting the hot combustion gases produced in the process through the reaction chamber of the reformed gas generator to heat up the catalysts.

A starting device of this type is described in U.S. Pat. No. 3,954,423. The disclosed device contains a first fuel injection nozzle, an air supply line, a flame dish arranged in the spray cone of the first injection nozzle, and an ignition device for igniting the atomized fuel which is collected in the flame dish. A second fuel injection nozzle which is directed toward a burner plate system with a narrow side extending up to the housing and which consists of at least one perforated sintered block containing a catlyst is also provided. The interior of the starting device is adapted for connection to the inlet of the reformed gas generator. During starting, fuel is first sprayed from the first fuel injection nozzle into the flame dish and is ignited there. The hot combustion gases are conducted over the burner plate system and subsequently, into the reformed gas generator. When the catalytic burner plate system is heated to a sufficiently high temperature, the first fuel injection nozzle is switched off and fuel is supplied directly to the burner plate system from the second fuel injection nozzle. The flame in the flame dish is then extinguished. Fuel and air can at this time be converted at the burner plate system understoichiometrically into a hot reformed gas, which can be conducted into the reaction chamber of the reformed gas generator and subsequently fed to the combustion chambers of the internal combustion engine. This hot fuel gas, which is generated at the catalyst of the starting device acts to both heat up the catalysts of the reformed gas generator itself, and for operating the internal combustion engine when idling.

This known starting device, however, is of a relatively expensive design and has a considerable overall volume. There is furthermore, the danger that the temperature sensitive catalysts of the burner plate system will be damaged by the hot combustion gases of the flame burning in the flame dish.

SUMMARY OF THE INVENTION

It is an object of the present invention to construct a starting device of the general type described above in such a manner that it has a small overall volume and as simple a design as possible. It should be able to be manufacturable easily as a mass-produced article and find room in the engine space of a motor vehicle.

The problem is solved in accordance with the present invention by arranging the burner plate such that nearly its entire surface can be supplied with the fuel; filling the outlet with a heat resistant, gas permeable terminating plate; disposing a combustion chamber between the burner plate and the terminating plate; providing means to introduce the atomized fuel and the air into the combustion chamber through the burner plate; and arranging the ignition device at the combustion chamber.

A solid cone nozzle for instance, which atomizes the emerging jet into the shape of a solid cone in such a manner that the entire surface of the burner plate is hit by the fuel can be used as the fuel injection nozzle.

To start the gas generator, fuel, e.g. gasoline, is first sprayed approximately uniformly onto a large area of the burner plate by means of the solid cone nozzle. At the same time, air is fed in through the air inlet and passes through the gas permeable burner plate, carrying along the atomized fuel. The combustion chamber is now filled up with a fuel mist, which is ignited by the ignition device. The flame produced in the combustion chamber quickly backfires on the burner plate, and the fuel can even then be burned without a flame while flowing through the burner plate, which becomes incandescent in the process. The hot flame gases produced are conducted through the terminating plate at the outlet of the starting device to the inlet of the reformed gas generator and, through the catalysts, to the reaction chamber of the latter. In the process, the catalytic charge is heated up and when the starting temperature of the catalyst is reached, i.e., that temperature which is required for an appreciable production of reformed gas in the reformed gas generator, the fuel injection nozzle can be switched off and the fuel required for the reformed gas production fed directly to the inlet of the reformed gas generator.

The terminating plate is used to define the combustion chamber during the operation of the starting device and to shield the starting device from the hot reaction chamber of the reformed gas generator after the starting device is switched off. During the starting, the fuel can be burned with excess air, but it can also be partially oxidized with air deficiency to form a flame gas which still contains combustible components and may already be sufficient for starting an internal combustion engine and operating it at no load, i.e., when idling.

In one preferred embodiment of the apparatus according to the present invention, a gas permeable distributor plate is disposed between the air inlet and the burner plate parallel to the burner plate, and the fuel injection nozzle protrudes through the distributor plate into the space between the distributor plate and the burner plate. This distributor plate produces a certain amount of backup in the air which is fed in. This leads to a reasonably uniform distribution of the air over the inside cross section of the starting device, so that the air subsequently flows through the burner plate uniformly. The distributor plate is furthermore warmed up by the reradiation of the hot burner plate and thereby leads to a pre-heating of the air flowing through.

Porous ceramic plates are preferably used as the burner plate, the terminating plate and, if applicable, the distributor plate. It is particularly advantageous if these ceramic plates have a multiplicity of passage canals going through them.

In a further preferred embodiment of the starting device according to the present invention, the interior is lined, at least partially, with ceramic material. This lining is advantageously ribbed. The lining protects the hot interior from the cool wall of the housing, which is made, for instance, of metal, and the ribs are used to hold the ceramic plates at a defined spacing.

The starting device is preferably designed substantially in the shape of a cup and the fuel injection nozzle is disposed along the central axis of the cup. The air inlet is preferably arranged at the side wall of the cup shaped housing in such a manner that the air can be introduced tangetially through the air inlet into the starting device. It is particularly advantageous if the side wall of the cup shaped starter housing contains at least one flat surface section. On this plane surface section the air inlet and/or the ignition device can advantageously be mounted.

BRIEF DESCRIPTION OF THE INVENTION

DETAILED DESCRIPTION OF THE INVENTION

Figure 1A:
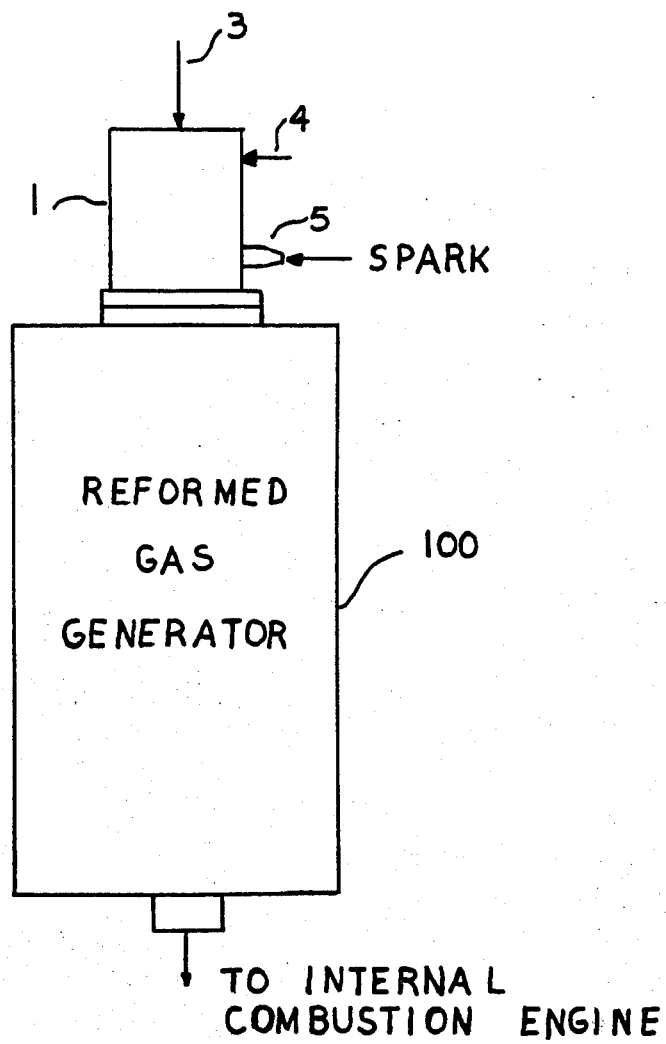
FIG. 1A is a block diagram illustrating the connection of the starting device according to the present invention to a reformed gas generator.

The starting device of the present invention includes: a cup shaped housing 1 which has its outlet opening 2 connected to the inlet of a reformed gas generator 100 as shown in FIG. 1A; a fuel injection nozzle 3; an air inlet 4; an electric spark plug 5 serving as the ignition device; a burner plate 6; a terminating plate 7 and a distributor plate 8.

The fuel injection nozzle 3 is disposed along the central axis of the starting device and protrudes through the distributor plate 8. A baffle element 9 is arranged in the nozzle opening. Nozzle 3 sprays nearly the entire surface of the burner plate 6 reasonably uniformly with the fuel (e.g. gasoline).

Porous, sintered ceramic plates, the thickness of which is between 0.05 and 1.5 cm are used as the burner plate 6, terminating plate 7 and distributor plate 8. Uniformly distributed over the surface of the plates is a multiplicity of passage canals, the diameters of which are substantially smaller than the plate thickness. For instance, magnesium oxide plates 1 cm thick with 40 to 60 passage canals per $cm^2$, the diameter of the passage canals being about 1 mm can be used as such ceramic plates. Magnesium oxide plates of this nature are heat resistant and are suited for the flameless reaction of gasoline. They exhibit a certain, though small, amount of catalytic activity for the oxidation of gasoline without the application of additional catalysts. In principle, catalytic plates are not even required as burner plates.

The plates 6, 7 and 8 are held in their respective positions by ceramic ribs or rings 11, 12 and 13. At the same time, these rings serve as a ceramic lining for the starting device. This establishes three chambers: first, a distributor chamber bounded by the housing 1, the distributor plates 8 and the rib 11, and having therein the air inlet 4; then, a mixing chamber formed by the distributor plate 8, the rib 12 and the burner plate 6, to which the air can be fed through the passage canals of the distributor plate 8 and fuel fed via the solid cone nozzle 3; and a combustion chamber 14 bounded by the burner plate 6, the terminating plate 7 and the ceramic rib 13. In the operation of the starting device, the air is conducted through the burner plate 6 into the combustion chamber 14 and carries along the fuel sprayed onto the burner plate in the process. The fuel/air mixture produced is ignited by the electric spark plug disposed in the combustion chamber. A shut off valve 17 at the injection nozzle is used to switch off the starting device.

The rim of the cup shaped housing has two parts 15 at the outlet opening which are bent outward and which serve as support pieces for the terminating plate 7.

Figure 1:
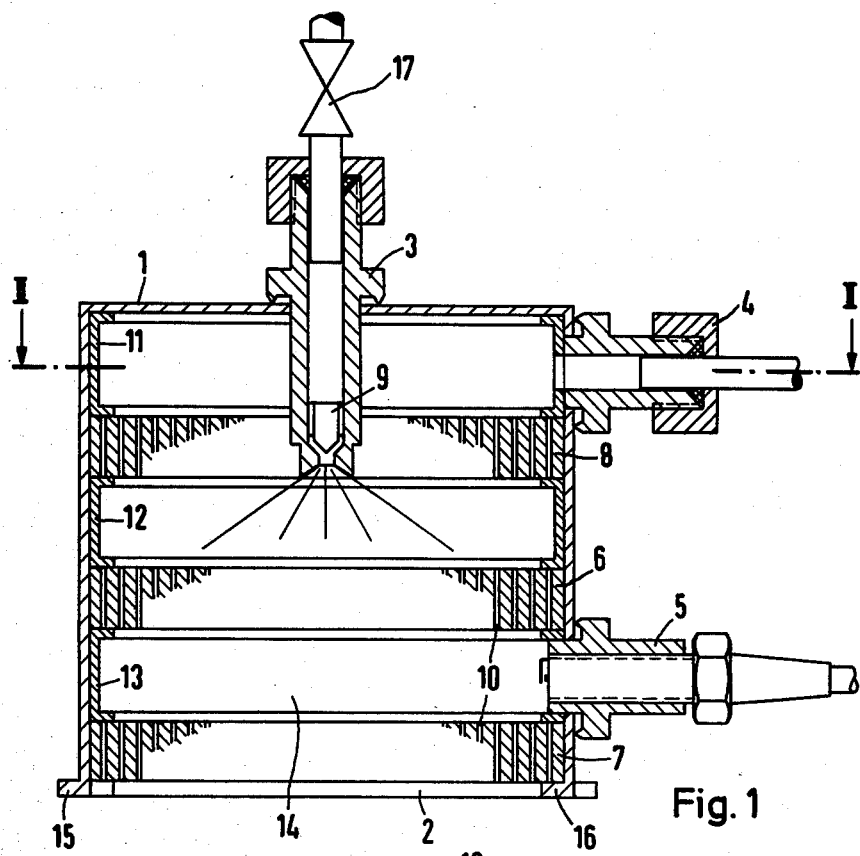
FIG. 1 is a longitudinal cross sectional through a preferred embodiment of the starting device according to the invention.
Figure 2:
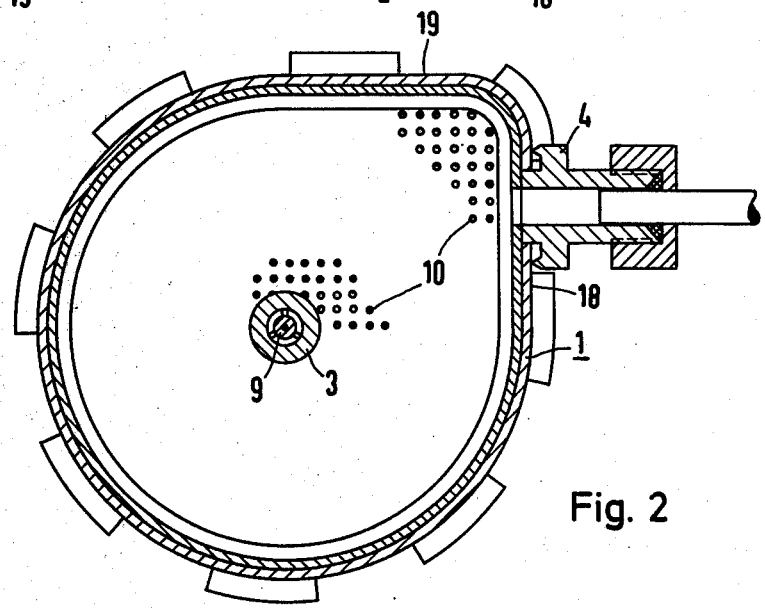
FIG. 2 is a cross section along the line designated II-II in FIG. 1.

As illustrated by FIG. 2, it can be seen that while the side wall of the housing is substantially of cylindrical shape, it has two plane surface sections 18 and 19, which are at a rounded right angle to each other. This permits mounting the air inlet 4 and the spark plug 5 at a plane surface section simplifying the assembly. Furthermore, the air inlet can be attached so that it points tangentially and not radially into the interior of the starting device. The entering air is thereby imparted with a rotation and is distributed uniformly over the surface of the distributor plate 8. This asymmertrical form also prevents the plates and ribs from turning and canting.

The starting device of the present invention consists of only a few parts which are easy to assemble, are subject to little wear and take up little overall volume.

What is claimed is:

1. In combination with a reformed gas generator in which atomized or evaporated, liquid hydrocarbon containing fuel is catalytically reacted with a gas containing oxygen at an elevated temperature to form a fuel gas particularly useful in the operation of internal combustion engines, an improved starting device comprising:
   (a) a housing which is small as compared to the reaction chamber of the gas generator, said housing having an outlet coupled to the inlet of the gas generator;
   (b) a gas permeable burner plate disposed within said housing with its edges in contact therewith;
   (c) a fuel ignition nozzle at least partially disposed within said housing such that the fuel sprayed thereby will cover nearly the entire surface of one side of said burner plate;
   (d) a heat resistant, gas permeable terminating plate filling the outlet of said housing, a combustion chamber being formed between said terminating plate and the other side of said burner plate;
(e) an ignition device disposed in said combustion chamber;
(f) an air inlet; and
(g) means for supplying air from said air inlet to said housing such that said air is introduced into said combustion chamber along with said atomized fuel through said burner plate.

2. A starting device according to claim 1 wherein said means for supplying air include a gas permeable distributor plate disposed between said air inlet and said burner plate parallel to said burner plate and wherein said fuel injection nozzle protrudes into the space between said distributor plate and said burner plate through said distributor plate.

3. A starting device according to claim 1 wherein said burner plate and said terminating plate comprise porous ceramic plates.

4. A starting device according to claim 2 wherein said burner plate, said terminating plate and said distributor plate comprise porous ceramic plates.

5. A starting device according to claim 4, wherein said ceramic plates contain a multiplicity of passage canals.

6. A starting device according to claim 1 and further including at least a partial ceramic lining in said housing.

7. A starting device according to claim 6, wherein said lining is ribbed.

8. A starting device according to claim 1 wherein said housing is substantially cup shaped and wherein said fuel injection nozzle is disposed along the central axis of the cup.

9. A starting device according to claim 8, wherein said air inlet is disposed so that air is introduced into said housing tangentially.

10. A starting device according to claim 9 wherein said housing has at least one plane surface section in its wall.

11. A starting device according to claim 9, wherein at least one of said air inlet and said ignition devices are arranged at said plane surface section.

* * * * *

UNITED STATES PATENT AND TRADEMARK OFFICE
CERTIFICATE OF CORRECTION

PATENT NO. : 4,134,739
DATED : January 16, 1979
INVENTOR(S) : Peter Gulden, et al.

It is certified that error appears in the above-identified patent and that said Letters Patent are hereby corrected as shown below:

Claim 1, line 63, change "a fuel ignition nozzle" to --a fuel injection nozzle--.

Signed and Sealed this

Seventeenth Day of April 1979

[SEAL]

Attest:

RUTH C. MASON
Attesting Officer

DONALD W. BANNER
Commissioner of Patents and Trademarks